(12) United States Patent
Peng

(10) Patent No.: US 9,990,353 B2
(45) Date of Patent: Jun. 5, 2018

(54) NATURAL LANGUAGE INTERFACE FOR SOFTWARE CUSTOMIZATION

(71) Applicant: SuccessFactors, Inc., South San Francisco, CA (US)

(72) Inventor: Yang Peng, Shanghai (CN)

(73) Assignee: SuccessFactors, Inc., South San Francisco, CA (US)

( * ) Notice: Subject to any disclaimer, the term of this patent is extended or adjusted under 35 U.S.C. 154(b) by 184 days.

(21) Appl. No.: 14/977,965

(22) Filed: Dec. 22, 2015

(65) Prior Publication Data
US 2017/0177561 A1    Jun. 22, 2017

(51) Int. Cl.
*G06F 17/27* (2006.01)
*G06F 9/54* (2006.01)

(52) U.S. Cl.
CPC .......... *G06F 17/2705* (2013.01); *G06F 9/546* (2013.01)

(58) Field of Classification Search
CPC ............................ G06F 9/546; G06F 17/2705
USPC ........................................................ 717/136
See application file for complete search history.

(56) References Cited

U.S. PATENT DOCUMENTS

| 2013/0035932 | A1* | 2/2013 | Bangalore | G06F 17/2785 704/9 |
| 2016/0124937 | A1* | 5/2016 | Elhaddad | G06F 17/2705 704/9 |
| 2016/0283468 | A1* | 9/2016 | Mueller | G06F 17/2795 |
| 2016/0306791 | A1* | 10/2016 | Allen | G06F 17/30654 |
| 2017/0083615 | A1* | 3/2017 | Boguraev | G06F 17/30684 |
| 2017/0177710 | A1* | 6/2017 | Burlik | G06F 17/30684 |

OTHER PUBLICATIONS

Lu et al., A Generative Model for Parsing . . . , 2008, ACL, pp. 783-792.*

* cited by examiner

*Primary Examiner* — John Chavis
(74) *Attorney, Agent, or Firm* — Schwegman Lundberg & Woessner, P.A.

(57) ABSTRACT

A system is provided. The system includes one or more hardware processors, a memory storing a plurality of parsing mechanics, each parsing mechanic of the plurality of parsing mechanics being associated with a plurality of functions provided by a software system, and a natural language interface engine, executing on the one or more hardware processors. The natural language interface engine configured to receive a first execution job from a user device of the natural language interface engine, the first execution job including a first sentence in a natural language, identify a first parsing mechanic from the plurality of parsing mechanics based on natural language contents of the first sentence, identify, from the identified first parsing mechanic, that a first function of the plurality of functions is associated with the first parsing mechanic, execute a first function call to the first function, and provide results to the user device.

20 Claims, 6 Drawing Sheets

NATURAL LANGUAGE INTERFACE FOR SOFTWARE CUSTOMIZATION

TECHNICAL FIELD

This document relates generally to software systems, and more particularly to a natural language interface for customization of software systems.

BACKGROUND

Some known enterprise software systems provide various software components that help business entities manage aspects of their business operations. For example, such software systems may provide features that enable the business to manage human resources, resource tracking and planning, security, accounting, customer relationship management, and so forth.

Often, software systems such as these enterprise software systems provide various built-in functionality and features, but that functionality may require customization to cater operation of the software systems to the particular needs of the user (e.g., software administrators of the business entity deploying the software system). For example, some software systems may provide a user interface or a scripting language that allows software administrators to customize the operations of the software system.

SUMMARY

In one embodiment, a system is provided. The system includes one or more hardware processors. The system also includes a memory storing a plurality of parsing mechanics. Each parsing mechanic of the plurality of parsing mechanics is associated with a plurality of functions provided by a software system. The system further includes a natural language interface engine, executing on the one or more hardware processors. The natural language interface engine is configured to receive a first execution job from a user device of the natural language interface engine. The first execution job includes a first sentence in a natural language. The natural language interface engine is also configured to access the memory and identify a first parsing mechanic from the plurality of parsing mechanics based on natural language contents of the first sentence. The natural language interface engine is further configured to access the memory and identify, from the identified first parsing mechanic, that a first function of the plurality of functions is associated with the first parsing mechanic. The natural language interface engine is also configured to execute a first function call to the first function. The natural language interface engine is further configured to provide results of at least one function call to the user device.

In another embodiment, a computerized method is provided. The method includes receiving a first execution job from a user device. The first execution job includes a first sentence in a natural language. The method also includes identifying, in a memory, a first parsing mechanic from a plurality of parsing mechanics based on natural language contents of the first sentence. Each parsing mechanic of the plurality of parsing mechanics is associated with a plurality of functions provided by a software system. The method further includes identifying, in the memory, that a first function of the plurality of functions is associated with the first parsing mechanic. The method also includes executing a first function call to the first function. The method further includes providing results of at least one function call to the user device.

In yet another embodiment, a non-transitory machine-readable medium storing processor-executable instructions is provided. When executed by a processor, the processor-executable instructions cause the processor to receive a first execution job from a user device. The first execution job includes a first sentence in a natural language. The processor-executable instructions also cause the processor to identify, from a memory, a first parsing mechanic from a plurality of parsing mechanics based on natural language contents of the first sentence. Each parsing mechanic of the plurality of parsing mechanics is associated with a plurality of functions provided by a software system. The processor-executable instructions further cause the processor to identify, from the memory, that a first function of the plurality of functions is associated with the first parsing mechanic. The processor-executable instructions further cause the processor to execute a first function call to the first function. The processor-executable instructions also cause the processor to provide results of at least one function call to the user device.

The above methods, apparatus, and computer program products may, in some implementations, further include one or more of the following features.

The natural language interface engine may also be configured to access the memory and identify, from the plurality of parsing mechanics, one or more parameter-identifying mechanics that are associated with the first function. The natural language interface engine may also be configured to extract a first parameter value from the first sentence using a first parameter-identifying mechanic of the one or more parameter-identifying mechanics. Executing the function call to the first function may include providing the first parameter value. The first function may include an application programming interface (API). Executing the first function call may include transmitting an API request to the API.

The natural language interface engine may also be configured to access the memory and identify first data from the results of the first function call. The natural language interface engine may also be configured to execute a second function call to a second function of the plurality of functions, the second function call includes the first data. The first execution job may include a second sentence. The natural language interface engine may also be configured to remove the second sentence from the first execution job. The natural language interface engine may also be configured to submit a second execution job to the system, the second execution job including the second sentence. The first parsing mechanic may include a pattern. Identifying the first parsing mechanic may include identifying the pattern within the first sentence. The first parsing mechanic may include a keyword. Identifying the first parsing mechanic may include identifying the keyword within the first sentence.

The method may include identifying, in the memory, one or more parameter-identifying mechanics that are associated with the first function. The method may include extracting a first parameter value from the first sentence using a first parameter-identifying mechanic of the one or more parameter-identifying mechanics. Executing the function call to the first function may include providing the first parameter value. The first function may include an application programming interface (API). Executing the first function call may include transmitting an API request to the API.

The method may include identifying first data from the results of the first function call. The method may include executing a second function call to a second function of the plurality of functions, the second function call includes the first data. The user execution job includes a second sentence. The method may include removing the second sentence from the first execution job. The method may include submitting a second execution job to the system, the second execution job including the second sentence. The first parsing mechanic may include a pattern. Identifying the first parsing mechanic may include identifying the pattern within the first sentence. The first parsing mechanic may include a keyword. Identifying the first parsing mechanic may include identifying the keyword within the first sentence.

The processor-executable instructions may also cause the processor to identify, from the memory, one or more parameter-identifying mechanics that are associated with the first function. The processor-executable instructions may also cause the processor to extract a first parameter value from the first sentence using a first parameter-identifying mechanic of the one or more parameter-identifying mechanics. Executing the function call to the first function includes providing the first parameter value. The processor-executable instructions may also cause the processor to identify first data from the results of the first function call. The processor-executable instructions may also cause the processor to execute a second function call to a second function of the plurality of functions, the second function call includes the first data.

The user execution job may include a second sentence. The processor-executable instructions may also cause the processor to remove the second sentence from the first execution job. The processor-executable instructions may also cause the processor to submit a second execution job to the system, the second execution job including the second sentence. The first parsing mechanic may include a pattern. Identifying the first parsing mechanic may include identifying the pattern within the first sentence. The first parsing mechanic may include a keyword. Identifying the first parsing mechanic may include identifying the keyword within the first sentence.

BRIEF DESCRIPTION OF DRAWINGS

The present disclosure illustrates embodiments of the inventive subject matter by way of example and not limitation, and with reference to the following drawings, in which like numbers represent like components.

DETAILED DESCRIPTION

Figure 1:
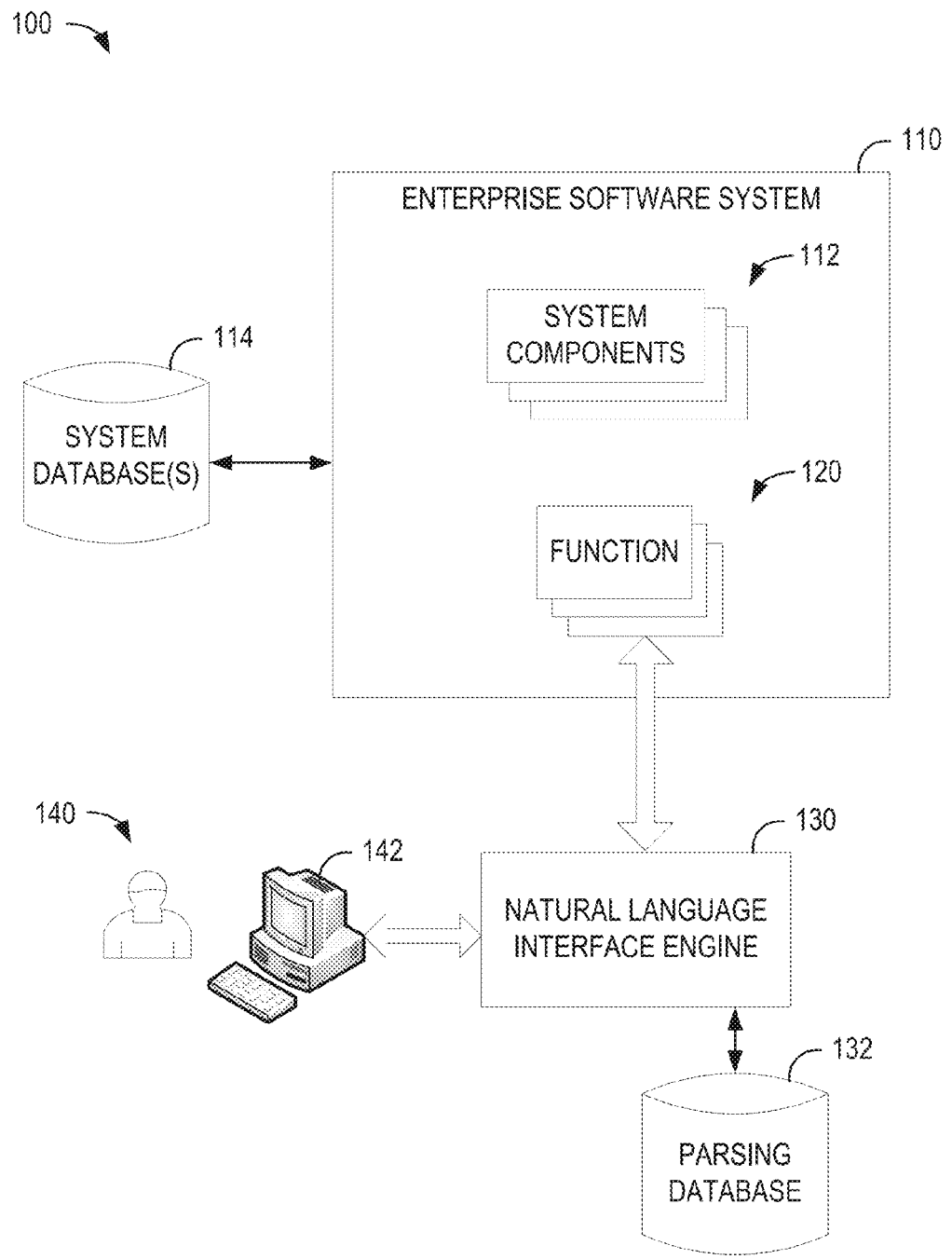
FIG. 1 is a block diagram illustrating a networked architecture, in accordance with an example embodiment, in which a user provides natural language input to a natural language interface engine (or just "interface engine").

The description that follows includes example systems, methods, techniques, instruction sequences, and computing machine program products that embody illustrative embodiments of the disclosure. For the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Software systems such as enterprise software systems may provide customization tools for their users (e.g., software administrators, or just "users" or "administrators", for purposes of convenience). Developers of such software systems often struggle with how best to provide customization interfaces and tools for the users, as various methods provide different challenges. For example, development of a user interface ("UI") or a scripting language may take extensive efforts to develop, troubleshoot, deploy, and support over time. Further, such tools may be difficult to understand, or have a steep learning curve for administrators.

These and other technical problems may be addressed by a natural language interface engine and associated methods described herein. The natural language interface engine (or just "interface engine") operates as a user interface through which users may customize a software system such as an enterprise software system. The natural language interface engine accepts input from the user in a natural language (e.g., sentences or statements written or spoken in English) and converts or translates this input into commands that are executed by the software system.

More specifically, the software system is pre-configured to provide multiple functions (e.g., through application programming interface ("API") calls, or methods defined by the software system). These functions represent an underlying "set of tools" associated with the software system that may be invoked by the administrator through their natural language sentences. The natural language interface engine includes a "pool" of parsing mechanics defined for these functions. Each function includes one or more parsing mechanics that describe how the associated function is going to be invoked or triggered through the natural language. For example, one parsing mechanic may identify a keyword or key phrase, such as "find", or "for every", where the occurrence of that keyword in a natural language input statement may invoke the associated function. Another parsing mechanic may provide a pattern or regular expression that triggers the associated function. For example, the regular expression "find.*employee" may be provided as a parsing mechanic for a "findEmployee( )" method.

During operation, the user enters a "user execution job" that includes one or more statements (e.g., sentences, clauses) in a natural language such as English. This input may be accepted from the user in any manner, such as verbally (e.g., translating from spoken audio into a digitized sentence), or typed (e.g., through a keyboard, or a text file). For example, the user may enter a statement such as "find all employees 50 years old or older and increase their salaries by 10%".

The natural language interface engine receives and parses this natural language-based user execution job using the pool of parsing mechanics, along with additional natural language processing steps. The interface engine identifies the implicated function(s) (e.g., based on one or more parsing mechanics) and may further identify one or more inputs or parameters to that function from the natural language statement (e.g., also based on one or more parsing mechanic). In other words, the interface engine identifies a particular function and associated parsing mechanics, and also extracts parameters (e.g., parameter values) for that function from the surrounding words or phrases in the statement. For example, from the example clause "for all employees 50 years old or older", the interface engine may identify the "searchEmployee( )" method as implicated based on the "search.*employee" parsing mechanic. Further, the interface engine also extracts the phrase "50 years old or older" (e.g., from the remainder of the clause), and from another parsing mechanic, identifies an implicated parameter (e.g., an "age" field in an underlying employee database, from the key phrase "years old") and, more particularly, a parameter value or value range for that parameter (e.g., "age>=50").

Similarly, the interface engine also parses the second clause of the example statement, "increase their salaries by 10%", which may invoke a "dbUpdate( )" method that generates, for example, SQL update commands that act on the employees identified by the first clause (e.g., those employees with age>=50) with the parameters provided in the clause (e.g., salary=salary+10%).

After parsing the statements or clauses, the interface engine submits function calls to the software system functions based on the parsing of that natural language input. In other words, the triggered parsing mechanic during parsing indicates the particular function(s) that are implicated by the natural language statement, along with the parameters for that function. Accordingly, the interface engine submits the function calls to, and receives associated responses from, the functions of the software system, thereby processing the natural language statements of the user.

FIG. 1 is a block diagram illustrating a networked architecture 100, in accordance with an example embodiment, in which a user 140 provides natural language input to a natural language interface engine (or just "interface engine") 130. The networked architecture 100 includes an enterprise software system 110 upon which the interface engine 130 executes operations based on the natural language input provided by the user 140.

Figure 6:
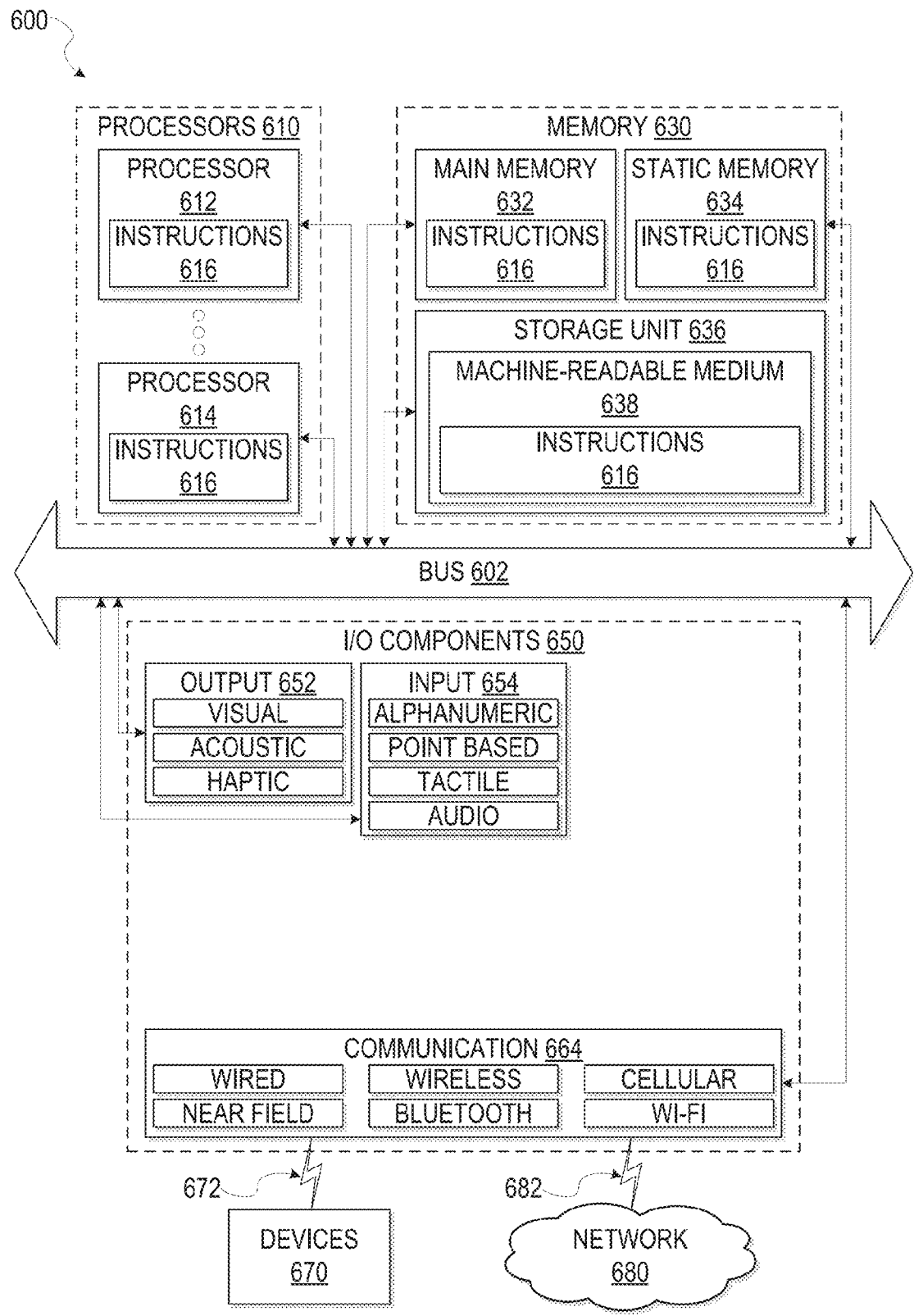
FIG. 6 is a block diagram illustrating components of a machine, according to some example embodiments, configured to read instructions from a machine-readable medium (e.g., a machine-readable storage medium) and perform any one or more of the methodologies discussed herein.

The natural language interface engine 130 operates on a computing device (not separately identified in FIG. 1) such as the machine 600 shown in FIG. 6. For example, the interface engine 130 may operate on a server computing device of the enterprise software system 110 (e.g., also hosting one or more system components 112), or may operate on a client device such as the user device 142. Further, the interface engine 130 provides a user interface through which the user 140 and a user computing device 142 interact with the interface engine 130.

The enterprise software system 110 may be, for example, an information system used to manage various operational aspects of a business entity. The enterprise software system 110 includes multiple system components 112, each of which may be configured to manage a particular aspect of operation of the business entity (e.g., a suite of applications). The enterprise software system 110 may also include one or more system databases 114 (e.g., relational databases) that support the data storage needs of the enterprise software system 110 (e.g., information regarding employees, customers, business assets, accounting, and so forth).

The enterprise software system 110 (e.g., the various system components 112) provides multiple functions 120 which are leveraged by the interface engine 130. For example, each system component 112 may provide one or more functions 120 unique to that component 112. Each of these functions 120 is configured to perform one or more tasks related to the enterprise software system 110, or one or more of the system components 112. The functions 120 may be presented for use via, for example, an application programming interface (API), or as programming methods or functions 120 (e.g., Java methods) which may be integrated with the interface engine 130 to perform the operations described herein. Each of the functions 120, broadly speaking, represents a tool which may be invoked or called by the interface engine 130, for example, to query data from, affect changes in, or perform operations within the enterprise software system 110 and related components 112.

The networked environment 100 also includes a parsing database 132 which is used by the interface engine 130. The parsing database 132 includes parsing mechanics used to parse the natural language input provided by the user 140 and to generate the associated calls to the functions 120. The parsing mechanics are discussed in greater detail below.

During operation, the user 140 provides natural language input to the interface engine 130 (e.g., through networked communication between the user computing device 142 and the interface engine 130). The user 140 may be, for example, a software administrator associated with the enterprise software system 110. The natural language input may be, for example, one or more English sentences or statements that embody the desired operations indicated by the user 140, such as "find the oldest employee and increase their salary by 10%". The interface engine 130 parses the natural language input (e.g., using parsing mechanics from the parsing database 132) and generates one or more function calls for the functions 120. The interface engine 130 then executes the function calls via the functions 120 and provides the results of the function calls to the user 140 (e.g., through a graphical user interface ("GUI")).

Figure 2:
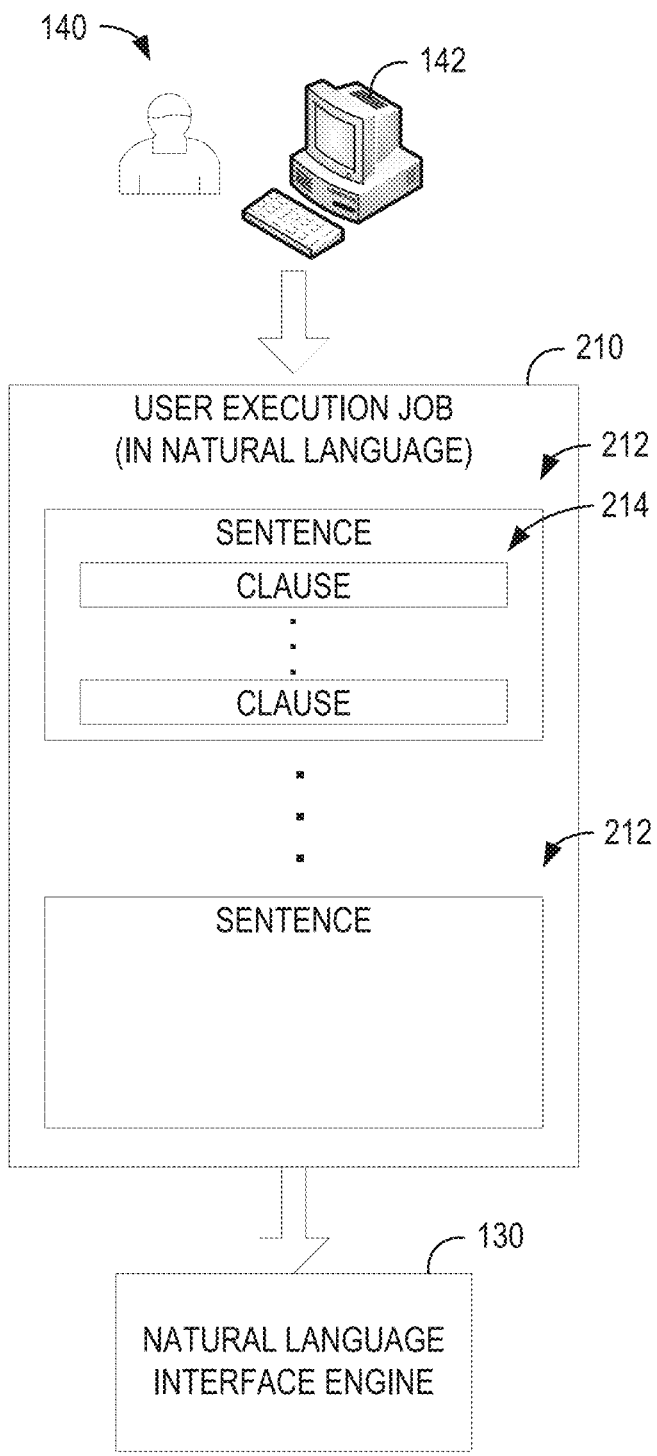
FIG. 2 illustrates an example user execution job submitted by the user to the natural language interface engine.

FIG. 2 illustrates an example user execution job 210 submitted by the user 140 to the natural language interface engine 130. The user execution job 210 includes one or more statements or sentences 212 provided by the user 140 in a natural language such as the English language (e.g., sentences formed using English grammar). The user execution job 210 may be provided as text to the interface engine 130. The user 140 may provide the user execution job 210 by typing the sentences into a text-based interface provided by the interface engine 130, or through a text-based file provided to the interface engine 130. The user 140 may provide the sentences 212, for example, via an audio input device (not separately shown in FIG. 2, e.g., a microphone recording the user 140 as she speaks the sentences 212) processed into ASCII text format by a speech recognition component (e.g., translating English speech into English text).

The sentences 212 provided by the user 140 represent commands or instructions, in English, that the user 140 desires to be executed within the enterprise software system 110. An example sentence 212 provided by the user 140 may be "find the oldest employee and increase their salary by 10%." Further, each natural language sentence 212 includes one or more propositions or clauses 214, within which are embedded information related to operations or actions requested by the user 140. For example, the sentence "find the oldest employee and increase their salary by 10%"

includes two clauses, the first of which is "find the oldest employee" (e.g., an independent clause), the second of which is "increase their salary by 10%" (e.g., a dependent clause). The first clause 214 represents an order from the user 140 to locate a particular employee (e.g., within an employee table of the system databases 114), namely the employee having the greatest age. The second clause 214 represents another order, relative to the first clause 214, to increase the salary of that oldest employee by 10%.

During operation, the interface engine 130 parses the natural language sentences 212 (e.g., the clauses 214) to determine which of the functions 120 to execute in order to complete the user execution job 210. For example, the first clause 214 is asking to identify a particular employee from a system database 114 (e.g., perform an SQL search and return a unique employee identifier). Thus, this first clause 214 may implicate an SQL query function 120, or a findEmployee( ) function 120. The interface engine 130 may also parse elements of the natural language sentences 212 to determine various configuration parameters provided by the user 140 within the sentence 212. For example, the first clause 214 provides an indication as to which employee(s) the user 140 desires to find, namely the "oldest", which may be used by the interface engine 130 to identify an "age" or "date of birth" field within the employee table, as well as the desired restriction on that field (e.g., "oldest" indicating only a single employee, either with the largest age, or with the most remote date of birth).

Figure 3:
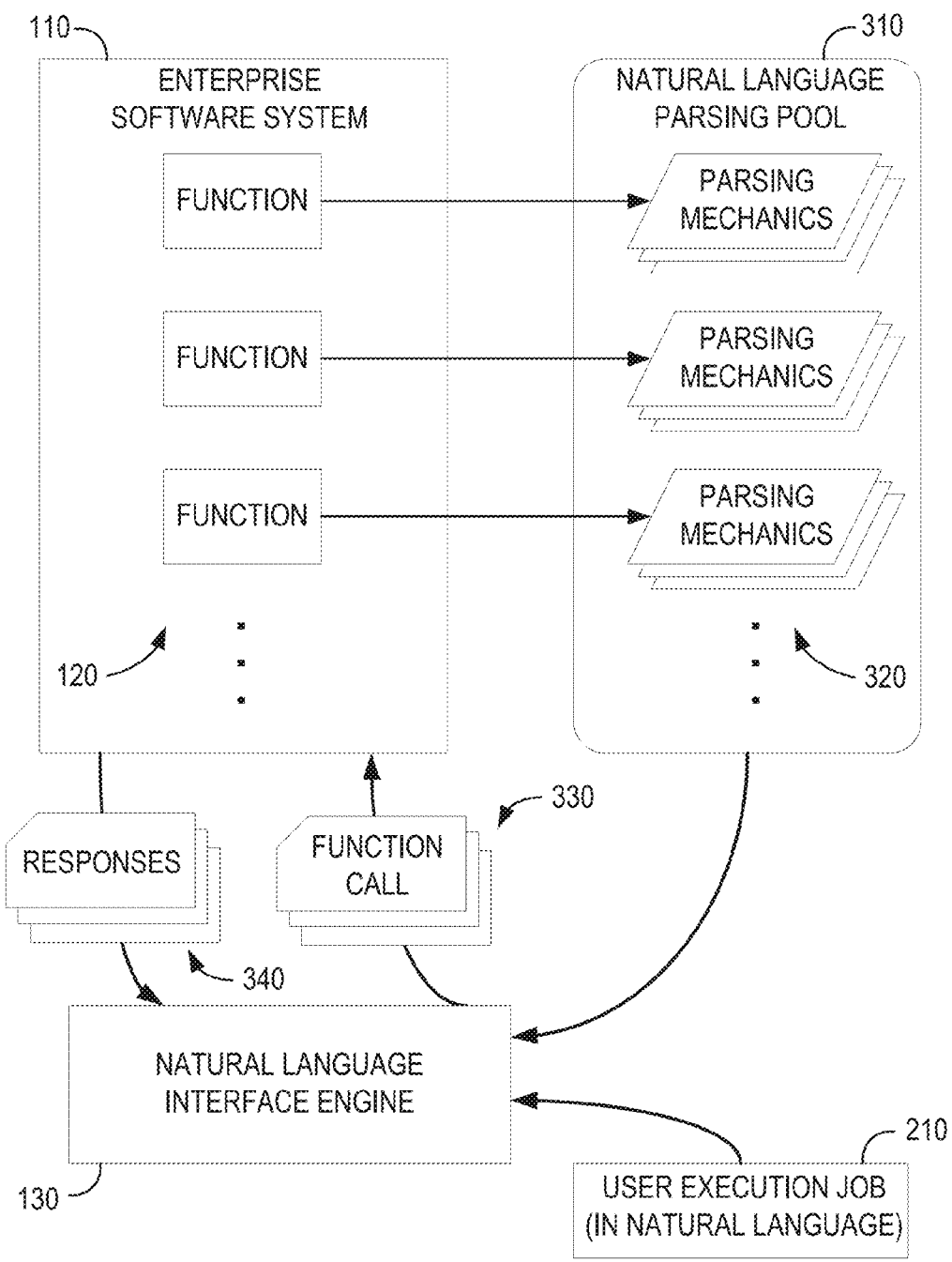
FIG. 3 is a data flow diagram illustrating an association between the functions provided by the enterprise software system and a natural language parsing pool of parsing mechanics.

FIG. 3 is a data flow diagram illustrating an association between the functions 120 provided by the enterprise software system 110 and a natural language parsing pool 310 of parsing mechanics 320. The interface engine 130 uses the parsing pool 310 (e.g., stored in the parsing database 132) to parse the user execution job 210 (e.g., the sentences 212 and/or clauses 214). Each function 120 has one or more associated parsing mechanics 320, where each parsing mechanic 320 provides one or more mechanisms for determining when the associated function 120 is implicated (e.g., in a sentence 212 or a clause 214), or for determining one or more parameters of the associated function 120 (e.g., from the natural language provided in the sentence 212 or the clauses 2114 of the user execution job 210).

The interface engine 130 parses the sentences 212 and clauses 214 of the user execution job 210 using the parsing pool 310 of parsing mechanics 320 to generate one or more function calls 330. These function calls 330 are then executed (e.g., in a sequence defined by the user execution job 210) by calling or executing the identified function(s) 120 with the parameters parsed from the user execution job 210. Some functions 120 may also provide responses 340 back to the interface engine 130, which may then present data from the responses 340 to the user 140 (e.g., a status of the function execution, or data requested by the user execution job 210, and so forth). Some data provided by responses 340 may be interim data used in subsequent function calls 330.

As described above, one type of parsing mechanic 320 is a parsing mechanic 320 which is used to identify which function 120 to invoke, or call, based on a particular sentence 212 or clause 214. These parsing mechanics 320 are referred to herein as "function-identifying mechanics." Each function 120 has at least one function-identifying parsing mechanic 320, and may have more. One example function-identifying mechanic 320 that may be used is word or phrase matching. For example, presume a function 120 "createUser( )" is provided by the enterprise software system 110, and that function 120 includes an associated word/phrase parsing mechanic 320 that includes the phrases "create user", "create a user", "create a new user", and "new user". As such, an occurrence of one of these phrases in a sentence 212 or clause 214 may invoke the function 120 "createUser( )". Another example function-identifying mechanic 320 that may be used is a pattern expression (e.g., a regular expression or other pattern matching method). For example, presume a function 120 "searchEmployee( )" is provided by the enterprise software system 110, and that function 120 includes an associated pattern parsing mechanic 320 that includes the pattern "(find or search)* (employee|user|people)" and the pattern "(among|in) (all|*)* (employee|user|people)*(find|search|list)". As such, an occurrence of one of these patterns in a sentence 212 or clause 214 may invoke the function 120 "searchEmployee( )".

Another type of parsing mechanic 320 is a parsing mechanic 320 which is used to identify parameters for the associated function 120. These types of parsing mechanics 320 are referred to herein as "parameter-identifying mechanics." Once a function 120 has been identified for a given clause 214 or sentence 212, the parameter-identifying mechanic(s) 320 for that function 120 may be used to parse parameters from the clause 214 or sentence 212. Each function 120 may have one or more parameter-identifying mechanics 320, or may have none. For example, presume the function 120 "searchEmployee( )" has been identified as the associated function 120 for the clause 214 "find the oldest employee . . . ." A parameter-identifying mechanic 320 may also be associated with the "searchEmployee( )" function 120 that identifies fields associated with searching employees (e.g., by name, but employee identifier, by age, by current salary, and so forth). This parameter-identifying mechanic 320 may parse the clause 214 for terms or other syntax that identifies which field to use to search. For example, an employee database 114 may include fields for first name, last name, employee identifier, date of birth, and so forth. Further, the parameter-identifying mechanic 320 may include terms or patterns indicating or implicating a search related to an age or date of birth field, such as "born after", "(an|*) age (of|*)", "older than", "old*", "birthday", "years old", and so forth. As such, the interface engine 130 uses the parameter-identifying mechanics 320 associated with the function 120 identified by the particular function-identifying mechanic 320 to determine one or more parameters and/or parameter values that may be used to call the function 120, thereby tailoring the execution of the function 120 to the request of the user 140.

Some user execution jobs 210 may include multiple clauses 214 or sentences 212 that relate to or otherwise affect each other ("cross-sentence" or "cross-clause" impact). For example, a first sentence 212 may establish a subset of employees upon which a second sentence 212 operates. Presume that the following two sentences are provided as a part of the user execution job 210:

Find all employees who started before Jan. 1, 2010.
Give each of those employees 2 days paid time off.

The first sentence 212 may invoke the example "searchEmployees( )" function 120 described above, with the associated parameters being, for example, "start_date<1/1/2010". Execution of this function 120 and associated parameters may identify a pool of employees (e.g., 24 employees who have been with the company since before Jan. 1, 2010). Based on context, the second sentence 212 is intended by the user 140 to operate upon the subset of data identified by the first sentence 212 (e.g., rows of the employee database 114).

For example, when encountering a single clause 214 or sentence 212 that identifies a subset of data (e.g., the 24 employees of this example) but does not act upon that subset of data (e.g., display, alter, or delete data), the interface engine 130 may infer that one or more subsequent statements may be intended to act upon that data. As such, the "searchEmployees( )" function 120 may be configured to return the row identifiers or employee identifiers when executed, and the interface engine 130 may then operate on each of those while executing the second sentence 212. In other words, in this example, the function call 330 for the first sentence 212 identifies the employee identifiers (e.g., provided in a response 340), which may be used (e.g., provided as an input parameter) during the function call 330 for the second sentence 212 (e.g., to update each identified employee with additional days paid time off).

The interface engine 130 may include conditional logic or looping functionality for parsing the user execution job 210, thereby enabling the user 140 to provide additional types of commands within the user execution job 210. For example, it may be useful to enable the user 140 to control execution of the operations (e.g., within the user execution job 210) by enabling the user 140 to provide statements such as:

If the employee is older than 50, then increase their salary by 10%;
or:
For each employee older than 50, increase their salary by 10%;
or:
Give every employee order than 50 a 10% salary increase.

To support such conditional and looping functionality, a function 120 and associated parsing mechanics 320 may be provided for each construct. These conditional and looping functions 120 may be provided by the enterprise software system 110 (e.g., as functions 120) or, alternately, by the interface engine 130 itself. For example, the clause "For each employee older than 50" may trigger a looping function (e.g., "for each") that will loop through each "employee older than 50" to perform other operations (e.g., as indicated by other clauses, such as "increase their salary by 10%").

Regarding conditional functions 120, function-identifying mechanics 320 and associated parameter-identifying mechanics 320 for conditional functions 120 may also be provided. For example, a conditional "if/then/else" style function 120 and associated parsing mechanics 320 may be provided. The function-identifying mechanic 320 for such a function 120 may include patterns such as "if*", "if*then*", "if*otherwise*", "do*otherwise*", and so forth. The "for" construct may be interpreted in the general form:

IF <conditional> THEN <then operation(s)> ELSE <else operation(s)> where the <conditional>, broadly speaking, represents the condition that is to be satisfied in order to perform the <then operation(s)> and, optionally, if the <conditional> is not true, then the <else operation(s)> are performed (or no operations are performed in the absence of the ELSE clause 214).

As such, parameter-identifying mechanics 320 may also be provided with the conditional functions 120. For example, the "if/then/else" style conditionals may include parsing mechanics 320 for parsing a conditional statement (e.g., <conditional>). One such parsing mechanic 320 may include identifying a field of a database table from the clause 214 or sentence 212. For example, presume the user execution job 210 includes the following sentence:

If the employee Bill Smith is older than 50, then increase his salary by 100%. As such, the segment "the employee Bill Smith is older than 50" represents the condition that is to be satisfied (e.g., evaluating to a Boolean true) in order to perform the "then" statements identified by the segment "increase his salary by 10%". Thus, the parsing mechanics 320 may be configured to parse conditions for the conditional, as well as parsing mechanics 320 for parsing the subsequent statements.

With regard to processing conditional functions 120, two things should be apparent. First, the parsing of the subsequent statements (e.g., <first operation(s)) may be parsed as normal clauses 214, as described herein. Since these are operations (e.g., function calls 330) to be performed if the condition is true, once the condition has been evaluated to true, then these statements are parsed and executed (e.g., just as if there had been no conditional). Second, it should be apparent that the condition parsing mechanics 320 may call other functions 120 during the parsing and evaluation of the <condition>. For example, to evaluate whether the employee Bill Smith is older than 50, the interface engine 130 may identify the need to invoke the "search Employee( )" function 120 as described above, along with associated parsing mechanics 320, in order to retrieve the age of Bill Smith, or otherwise to evaluate the truth of the condition.

Regarding looping functions 120, function-identifying mechanics 320 and associated parameter-identifying mechanics 320 for looping functions 120 may also be provided. Looping style functions 120 may include a "while" style function 120, or a "for/for each" style function 120. For example, a "for" loop function 120 may include a function-identifying mechanic 320 that includes "for*", "for each*", "loop", "for*every", "for*all", and so forth. Presume that the user execution job 210 includes the following sentences 212:

Find all employees who started before Jan. 1, 2010.
For each employee, give the employee 2 days paid time off.

The first sentence 212 identifies the subset of employees upon which the second statement will operate (e.g., the employee identifiers, or otherwise, as described above). The "for" construct may be interpreted in the general form:

FOR <counter statement>, <operation(s)>
where the <counter statement>, broadly speaking, represents the cycling or counting through each of the elements of the set, and where the <operation(s)> represent the one or more operations to be performed on each cycle in the loop. As such, the parameter-identifying mechanics 320 associated with the "for" loop function 120 may include identifying that the subsequent operation, represented by the "give the employee 2 days paid time off" (e.g., the operation to be performed within the loop), as well as identifying the object of the loop (e.g., each employee previously identified by the first sentence 212).

The interface engine 130 may enable the user 140 to nest the parsing features described herein (e.g., statement parsing, loop parsing, conditional parsing) within other parsing features, thereby enabling a more dynamic and rich ability to parse natural language user execution jobs 210.

While many of the example functions 120 provided herein involve database transactions (e.g., database queries, updates, additions, or deletions), the actions provided by these functions 120 and other functions 120 are possible. For example, presume that the user execution job 210 includes the following sentences 212:

For each employee working for the company for more than 10 years,
send me an email to report their annual performance review scores in detail.

Figure 4:
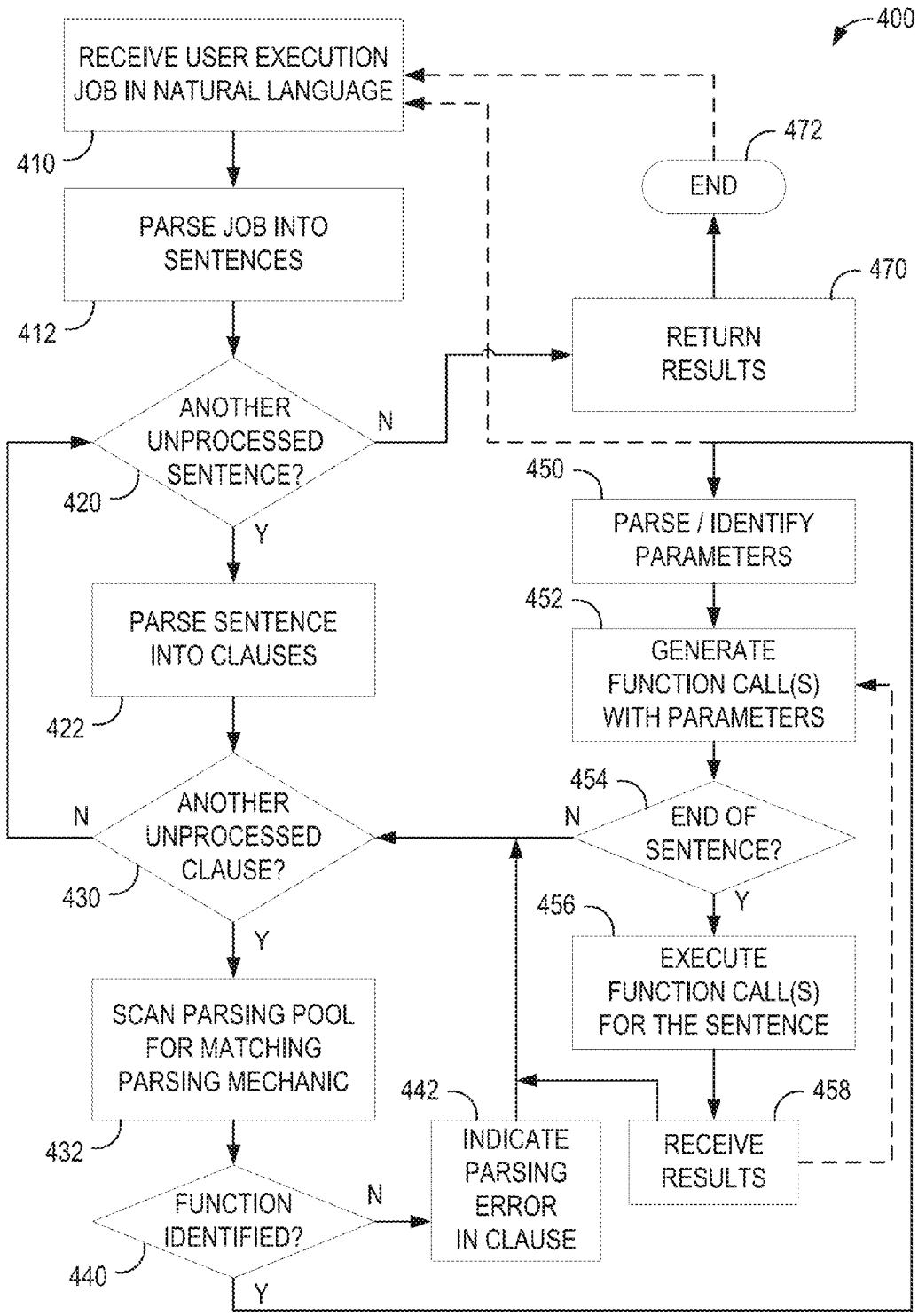
FIG. 4 illustrates a method, in accordance with an example embodiment, for providing a natural language interface, such as the natural language interface engine.

This example user execution job 210 may be used, for example, for providing a reporting service integration, mapping into a "report" API or function 120 predefined as:
    findEmployees, parameters: serviceyears>10
    (return value as context.Users)
    sendEmail, parameters: content=report( )
    report, parameters: type=performance, target=context.Users FIG. 4 illustrates a method 400, in accordance with an example embodiment, for providing a natural language interface, such as the natural language interface engine 130. The method 400 is performed by one or more computing devices each comprising at least one processor, such as the machine 600 shown in FIG. 6. In the example embodiment, the method 400 includes receiving a user execution job 210 in a natural language, such as English text. The method 400 may include reducing the user execution job 210 to English text (e.g., converting from an audio recording, or translating from another language), in operation 410. At operation 412, the user execution job 210 is parsed into one or more sentences 212 (e.g., such that each sentence 212 is individually identifiable). The method 400 then operates on each sentence 212.

At operation 420, the method 400 loops for each sentence 212. The next unprocessed sentence 212 (e.g., in an order as defined by the user execution job 210) is selected for processing. If there are no remaining unprocessed sentences 212, then the method 400 returns any results (e.g., from executed function calls 330) at operation 470, and the method ends at operation 472. In some embodiments, the method 400 may loop back to operation 410, thereby showing the results of the just-processed user execution job 210 and enabling the user 140 to enter another user execution job 210 (e.g., for follow-on operations, or for other operations).

Referring back to operation 420, if there is an unprocessed sentence 212, then that "target sentence" 212 is selected and parsed into one or more clauses 214 at operation 422. The method 400 then loops for each clause 214 of the target sentence 212. If there are no remaining unprocessed clauses 214 for the target sentence 212, then the method 400 loops back to operation 420 to move on to the next unprocessed sentence 212.

If there is an unprocessed clause 214 at operation 430, then that "target clause" 214 is selected for processing. At operation 432, the parsing pool 310 is scanned for a matching parsing mechanic 320 and, more particularly, a function-identifying mechanic 320 that matches on the target clause 214. In other words, all of the function-identifying parsing mechanics 320 are analyzed to determine if there is a matching parsing mechanic 320 for that target clause 214 (e.g., if the target clause 214 includes a pattern for which there is an associated function 120).

At operation 440, if no function-identifying parsing mechanic 320 matches the target clause 214, then a parsing error is indicated (e.g., for that clause 214) at operation 442. In some embodiments, the method 400 may be terminated immediately if no function 120 is identified at operation 440 for a target clause 214. In the example method 400 shown here, the error is indicated at operation 442, but parsing proceeds with the next clause 214, looping back to operation 430 for the next target clause 214. In some embodiments, if multiple function-identifying mechanics 320 match a particular unprocessed clause 214, an error may be generated alerting the user 140 to the ambiguity at operation 442.

If a function-identifying parsing mechanic 320 is triggered for the target clause 214 at operation 440, then the function 120 associated with that parsing mechanic 320 becomes the "identified function" 120 for that target clause 214. As such, the method 400 proceeds to parse the target clause 214 to identify any parameters associated with the identified function 120 that may have been provided within the target clause 214. More specifically, as described above, each function 120 may have one or more parameter-identifying mechanics 320 associated with that function 120. As such, the method 400 applies the target clause 214 to those parameter-identifying mechanics 320 for the identified function 120. Any resulting parameters identified at operation 450 are then used to generate a function call 330 to the identified function 120 at operation 452.

In some embodiments, the method 400 may include looping or recursion to process some constructs or functions 120. For example, at operation 450 (or at operation 440), the method 400 may implement recursion with a subset of the original user execution job 210. Some functions 120 or parsing mechanics 320 may invoke the method 400 with some of the clauses 214, or sentences 212, or some combination thereof, to complete some of the operations. For example, a "for each" function 120 may include one or more operations that are to be performed on each identified data element, such as for each employee identified by a prior function call 330. As such, the sentences 212 and clauses 214 within the scope of the "for each" function 120 may be extracted from the original user execution job 210 and submitted with a recursive call to the method 400 (e.g., to operation 410), with the extracted sentences 212 and clauses 214 submitted as an "inner" user execution job 210 (e.g., with input data specific to a single employee). This may be performed for each of the employees such as to perform the exterior "for each" function 120 provided in the original user execution job 210. Similarly, the "for each" function 120 may be implemented in method 400 by looping from operation 458 to operation 452 for each element in the set of elements (e.g., a single function call 330 per loop).

In some embodiments, after generating the function call 330 with parameters at operation 452, the method 400 may proceed to execute the function call(s) 330 at operation 456. In some situations, certain function calls 330 may be held pending additional processing. For example, the function call(s) 330 from a first clause 214 of a sentence 212 may be held, or queued, pending parsing of a second clause 214 of that sentence 212. In the example embodiment, in such situations, the method 400 evaluates whether the target clause 214 is complete and ready for execution at operation 454. If additional processing is necessary before executing the currently-queued function call(s) 330, then the method 400 diverts to operation 430 for processing another clause, thereby holding the prior function call(s) (e.g., generated at operation 452) until another clause is processed. If or when no additional processing is necessary at operation 454, then the method 454 proceeds to execution of the function call(s) 330 at operation 456.

At operation 456, the method 400 executes the function call 330 for the target clause 214. In some embodiments, the method 400 may execute multiple function calls 330 (e.g., for each clause 214 in the sentence 212 queued based on the parsing of one or more clauses 214). For example, the function call 330 may be transmitted to a system component 112 of the enterprise software system 110 associated with the target function 120. At operation 458, the method 400 receives the results of the function call 330 (e.g., a response 340). These results may include status data for the execution of the function call 330 (e.g., a return code), log data associated with the execution of the function call 330, or data requested as a part of the function call 330 (e.g., data from the system database 114). In some embodiments, the function 120 provides the return data in context, which may vary based on the type of function 120. For example, a "search all employees" type function 120 may return data in context as "users", "objects", and "employees", where a "loop" type function 120 may return data such as "user", "currentObject", "currentUser", and so forth. Different functions 120 may return different objects. Once the results are received at operation 458, the method 400 loops back to process the net unprocessed clause 214 at operation 430.

For example, presume the user execution job 210 comprises the following lines (numbered here purely for sake of discussion):

(1) Find all the employees who were hired after Jan. 1, 2015.
(2) For each employee, do the following:
(3) If employee's age is older than 40, then give him 2 days paid time off,
(4) otherwise, give the employee 1 day paid time off.

Parsing these lines (1)-(4) into sentences 212 (e.g., operation 412) may yield line (1) as a first sentence 212, line (2) as a second sentence 212, and line (3) and (4) together as a third sentence 212.

The first sentence 212 (e.g., line (1)) is parsed into a single clause 214, and is function-identified with a parsing mechanic 320 associated with the "searchEmployee( )" function 120 (e.g., at operation 440). Several parameter-identifying mechanics 320 are provided with the "searchEmployee( )" function 120, including a "hireDateAfter" parsing mechanic 320 that includes a pattern "(onboard|start*work|hired)*(since|after|on)* (${hireDateAfter=DATEFORMAT})". This pattern matches on the first sentence 212, and thus the "hireDateAfter" parameter is determined to be "Jan. 1, 2015" (e.g., at operation 450). As such, a function call 330 is generated as "searchEmployee(["hireDateAfter": "01/01/2015" ]) (e.g., at operation 452). This function call 330 is executed (e.g., at operation 456), and returns a result at operation 458 including 5 employees matching the given criteria.

Continuing the example, the second sentence (e.g., line (2)) function-identifies with a programming construct or "for each" function 120. The "for each" function 120 takes a general form "FOR EACH <set of elements> <block of operations>", where <block of operations> identifies one or more operations that are to be performed for each element in the <set of elements> (e.g., for each employee in the set of 5 employees identified by the function call 330 from the first sentence 212). The <block of operations> for the "for each" loop is embodied in the third sentence 212. In other words, the third sentence 212 is performed for each of the 5 identified employees. In this example, the method 400 processes the "for each" loop via recursion, calling the method 400 again multiple times, once for each employee. Each recursive call to the method 400 includes the example third sentence 212 as the user execution job 210 for that recursion. As such, the original processing of the method 400 (the "outer method" processing) initiates the recursive call to the method 400 five times, one for each employee, receives the results of each, but otherwise parses no more sentences 212 or clauses 214 itself (as there are no additional sentences 212 past the third, which is addressed by the "for each" recursion).

Within each recursive call to the method 400, the third sentence 212 is processed for the single provided employee. The third sentence 212 is a conditional statement in the form of an "if/then/else" construct or function 120, as described above. In simple forms of an "if/then/else" function 120 (e.g., where there is only a single operation provided for the <then operation>, and optionally only a single operation provided for the <else operation>, such as this example third sentence), the third sentence 212 may be parsed into a clause 214 for the <conditional>, a clause 214 for the <then operation>, and a clause 214 for the <else operation>. The <conditional> clause 214 is first processed (e.g., via operations 450 to 458) to determine the truth value of the <conditional>. Subsequently, and based on the truth value of the <conditional>, either the <then operation> or the <else operation> are performed (e.g., again, via operations 450 to 458).

For more complex "if/then/else" functions 120 (e.g., with more complex <conditionals>, <then operations>, or <else operations>), the method 400 may use recursion to evaluate some or all of these components 112. For example, if the <then operations> include multiple sentences 212, then the method 400 may call itself (e.g., back to operation 410) with an inner user execution job 210 that includes the <then operations>, and optionally any dependent input data.

Some alternative embodiments for executing function calls 330 are possible. In this example method 400, the steps include executing clauses 214, components of clauses 214, or sentences 212 prior to moving on to the next clause 214 or sentence 212. In other embodiments, the method 400 may attempt to parse the entire user execution job 210 prior to executing any of the generated function calls 330. In such embodiments, the method 400 may generate and "stage" a series of function calls 330 and associated parameters (or place-holders for parameters). If the parsing of all sentences 212 and clauses 214 of the user execution job 210 is successful, then the method 400 may subsequently proceed with execution of the series of function calls 330. In other words, the commands provided in the user execution job 210 may only be executed if each and all of the sentences 212 and clauses 214 are properly parsed (e.g., functions 120 and associated parameters identified) by the method 400 (e.g., as the successful processing of some commands may be reliant upon the successful processing of one or more preceding commands). In some embodiments, the function calls 330 may be generated and displayed to the user 140 prior to execution (e.g., for purposes of troubleshooting or certifying that the user execution job 210 was properly interpreted by the method 400).

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 5:
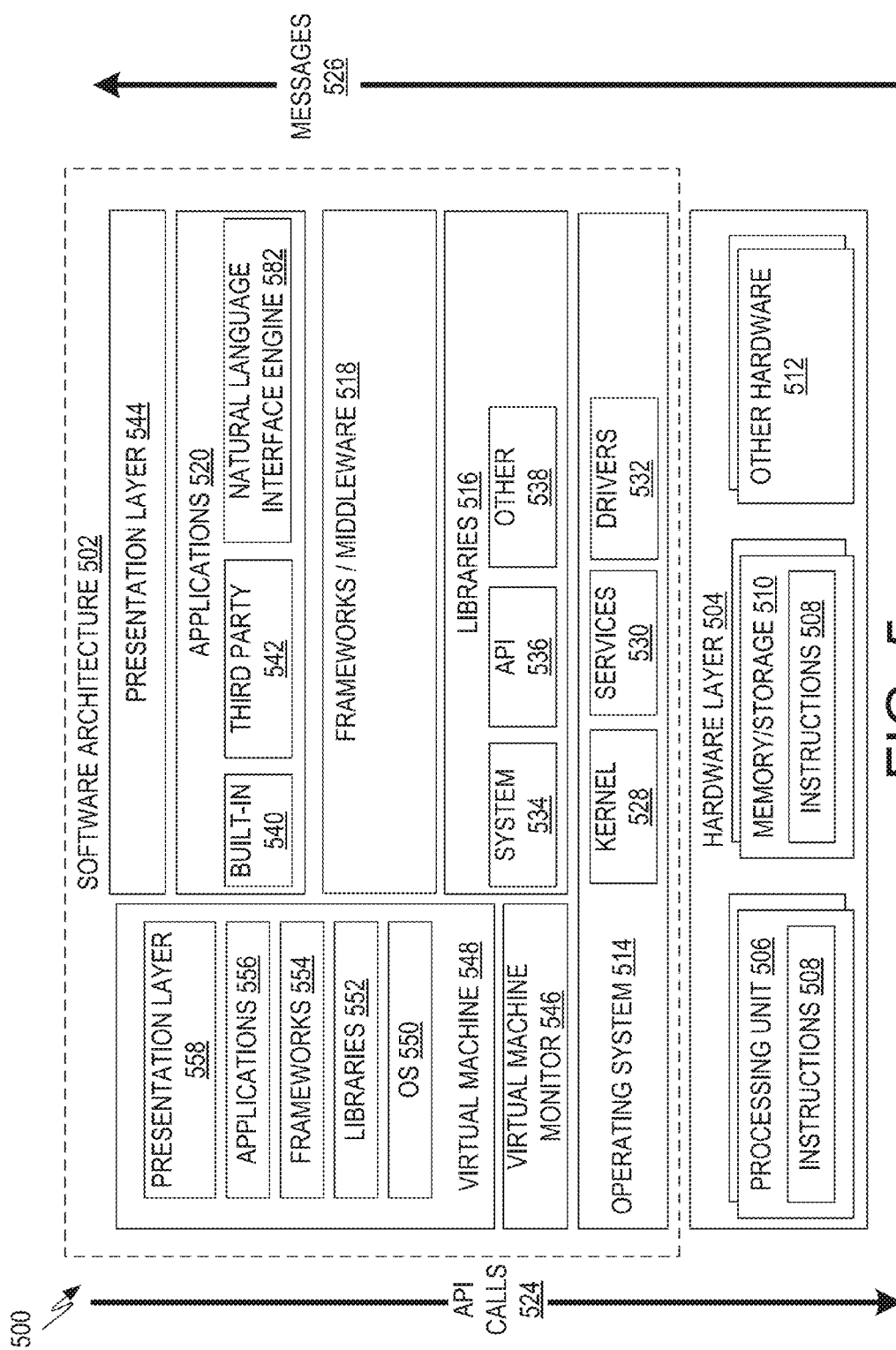
FIG. 5 is a block diagram illustrating an example software architecture, which may be used in conjunction with various hardware architectures herein described, to provide the natural language interface systems and methods herein described.

FIG. 5 is a block diagram 500 illustrating an example software architecture 502, which may be used in conjunction with various hardware architectures herein described, to provide the natural language interface systems and methods herein described. A natural language interface engine 582 may be similar to the interface engine 130 shown in FIGS. 1-3. FIG. 5 is a non-limiting example of a software architecture 502 and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 having associated executable instructions 508. The executable instructions 508 represent the executable instructions of the software architecture 502, including implementation of the methods, modules and so forth described herein. The hardware layer 504 also includes memory/storage 510, which also includes the executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks or middleware 518, applications 520 and a presentation layer 544. Operationally, the applications 520 and/or other components within the layers may invoke application programming interface (API) calls 524 through the software stack and receive a response as messages 526. The layers illustrated are representative in nature and not all software architectures 502 have all layers. For example, some mobile or special purpose operating systems 514 may not provide the frameworks/middleware 518, while others may provide such a layer. Other software architectures 502 may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) provide a higher-level common infrastructure that may be used by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system 514 or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any an application developed using the Android™ or iOS™ software development kit (SDK) by an entity other than the vendor of the particular platform, and may be mobile software running on a mobile operating system 514 such as iOS™, Android™, Windows® Phone, or other mobile operating systems 514. The third-party applications 542 may invoke the API calls 524 provided by the mobile operating system such as operating system 514 to facilitate functionality described herein.

The applications 520 may use built-in operating system functions (e.g., kernel 528, services 530 and/or drivers 532), libraries 516, or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures 502 use virtual machines. In the example of FIG. 5, this is illustrated by a virtual machine 548. The virtual machine 548 creates a software environment where applications/modules can execute as if they were executing on a hardware machine (such as the machine 600 of FIG. 11, for example). The virtual machine 548 is hosted by a host operating system (e.g., operating system 514) and typically, although not always, has a virtual machine monitor 546, which manages the operation of the virtual machine 548 as well as the interface with the host operating system (i.e., operating system 514). A software architecture executes within the virtual machine 548 such as an operating system (OS) 550, libraries 552, frameworks 554, applications 556, and/or a presentation layer 558. These layers of software architecture 502 executing within the virtual machine 548 can be the same as corresponding layers previously described or may be different.

FIG. 6 is a block diagram illustrating components of a machine 600, according to some example embodiments, configured to read instructions 616 from a machine-readable medium 638 (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. As such, the instructions 616 may be used to implement modules or components described herein. The instructions 616 transform the general, non-programmed machine 600 into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), a cellular telephone, a smart phone, a mobile device, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 612 and a processor 614 that may execute the instructions 616. The term "processor" is intended to include a multi-core processor 612 that may comprise two or more independent processors 612, 614 (sometimes referred to as "cores") that may execute instructions 616 contemporaneously. Although FIG. 6 shows multiple processors 612, 614, the machine 600 may include a single processor 612 with a single core, a single processor 612 with multiple cores (e.g., a multi-core processor), multiple processors 612, 614 with a single core, multiple processors 612, 614 with multiples cores, or any combination thereof.

The memory/storage 630 may include a memory, such as a main memory 632, a static memory 634, or other memory, and a storage unit 636, both accessible to the processors 610 such as via the bus 602. The storage unit 636 and memory 632, 634 store the instructions 616 embodying any one or more of the methodologies or functions described herein. The instructions 616 may also reside, completely or partially, within the memory 632, 634, within the storage unit 636, within at least one of the processors 610 (e.g., within the processor's cache memory), or any suitable combination thereof, during execution thereof by the machine 600. Accordingly, the memory 632, 634, the storage unit 636, and the memory of processors 610 are examples of machine-readable media 638.

As used herein, "machine-readable medium" means a device able to store instructions 616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 650 may include a wide variety of components to receive input, provide output, produce output, transmit information, exchange information, capture measurements, and so on. The specific input/output (I/O) components 650 that are included in a particular machine 600 will depend on the type of machine. For example, portable machines 600 such as mobile phones will likely include a touch input device or other such input mechanisms, while a headless server machine 600 will likely not include such a touch input device. It will be appreciated that the input/output (I/O) components 650 may include many other components that are not shown in FIG. 6. The input/output (I/O) components 650 are grouped according to functionality merely for simplifying the following discussion and the grouping is in no way limiting. In various example embodiments, the input/output (I/O) components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The input/output (I/O) components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine 600 or any of a wide variety of peripheral devices (e.g., a peripheral device coupled via a Universal Serial Bus (USB)).

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
    one or more hardware processors;
    a memory storing a plurality of parsing mechanics, each parsing mechanic of the plurality of parsing mechanics being associated with a plurality of functions provided by a software system; and
    a natural language interface engine, executing on the one or more hardware processors, configured to, at least:
        receive a first execution job from a user device of the natural language interface engine, the first execution job including a first sentence in a natural language;
        determine that a first function of the plurality of functions is implicated by the first sentence using a first parsing mechanic of the plurality of parsing mechanics, the first parsing mechanic being a function-identifying mechanic;
        determine one or more parameter values to be used for calling the function using a second parsing mechanic of the plurality of parsing mechanics, the second parsing mechanic being a parameter-identifying mechanic associated with the first parsing mechanic;
        execute a first function call to the first function using the one or more parameter values; and
        provide results of at least one function call to the user device.

2. The system of claim 1, wherein the natural language interface engine is further configured to:
    extract a first parameter value of the one or more parameters values from the first sentence based on a matching of terms included in the first sentence with fields in a database identified by the parameter-identifying mechanic.

3. The system of claim 1, wherein the first function includes an application programming interface (API) and the executing the first function call includes transmitting an API request to the API.

4. The system of claim 1, wherein the natural language interface engine is further configured to:
    identify first data from the results of the first function can; and
    execute a second function call to a second function of the plurality of functions, the second function call including the first data.

5. The system of claim 1, wherein the first execution job includes a second sentence and the natural language interface engine is further configured to:
    remove the second sentence from the first execution job; and
    submit a second execution job to the system, the second execution job including the second sentence.

6. The system of claim 1, wherein the second parsing mechanic includes a pattern and the determining of the one or more parameter values includes matching the pattern within the first sentence.

7. The system of claim 1; wherein the first parsing mechanic includes a keyword, and the determining that the first function is implicated by the first sentence includes identifying the keyword within the first sentence.

8. A computerized method comprising:
    receiving a first execution job from a user device, the first execution job including a first sentence in a natural language;
    determining that a first function of a plurality of functions is implicated by the first sentence using a first parsing mechanic of a plurality of parsing mechanics, the first parsing mechanic being a function-identifying mechanic, the plurality of functions provided by a software system;
    determining one or more parameter values to be used for calling the function using a second parsing mechanic of the plurality of parsing mechanics, the second parsing mechanic being a parameter-identifying mechanic associated with the first parsing mechanic;
    executing a first function call to the first function using the one or more parameter values; and
    providing results of at least one function call to the user device.

9. The method of claim 8, further comprising:
    extracting a first parameter value of the one or more parameters values from the first sentence based on a matching of terms included in the first sentence with fields in a database identified by the parameter-identifying mechanic.

10. The method of claim 8, wherein the first function includes an application programming interface (API) and the executing the first function call includes transmitting an API request to the API.

11. The method of claim 8, further comprising:
    identifying first data from the results of the first function call; and
    executing a second function call to a second function of the plurality of functions, the second function call including the first data.

12. The method of claim 8, wherein the user execution job includes a second sentence and the method further comprises:
    removing the second sentence from the first execution job; and
    submitting a second execution job to the system, the second execution job including the second sentence.

13. The method of claim 7, wherein the second parsing mechanic includes a pattern and the determining of the one or more parameter values includes matching the pattern within the first sentence.

14. The method of claim 8, wherein the first parsing mechanic includes a keyword and the determining that the first function is implicated by the first sentence includes identifying the keyword within the first sentence.

15. A non-transitory machine-readable medium storing processor-executable instructions which, when executed by a processor, cause the processor to, at least:
    receive a first execution job from a user device, the first execution job including a first sentence in a natural language;
    determine that a first function of a plurality of functions is implicated by the first sentence using a first parsing mechanic of a plurality of parsing mechanics, the first parsing mechanic being a function-identifying mechanic, the plurality of functions provided by a software system;
    determine one or more parameter values to be used for calling the function using a second parsing mechanic of the plurality of parsing mechanics, the second parsing mechanic being a parameter-identifying mechanic associated with the first parsing mechanic;
    execute a first function call to the first function using the one or more parameter values; and
    provide results of at least one function call to the user device.

16. The machine-readable medium of claim 15, wherein the processor-executable instructions further cause the processor to:

extract a first parameter value of the one or more parameters values from the first sentence based on a matching of terms included in the first sentence with fields in a database identified by the parameter-identifying mechanic.

17. The machine-readable medium of claim 15, wherein the processor-executable instructions further cause the processor to:

identify first data from the results of the first function call; and execute a second function call to a second function of the plurality of functions, the second function call including the first data.

18. The machine-readable medium of claim 15, wherein the user execution job includes a second sentence and the processor-executable instructions further cause the processor to:

remove the second sentence from the first execution job; and submit a second execution job to the system, the second execution job including the second sentence.

19. The machine-readable medium of claim 15, wherein the first parsing mechanic includes a pattern and the determining of the one or more parameter values includes matching includes identifying the pattern within the first sentence.

20. The machine-readable medium of claim 15, wherein the first parsing mechanic includes a keyword and the determining that the first function is implicated by the first sentence includes identifying the keyword within the first sentence.

* * * * *